June 28, 1966  R. J. MEIJER  3,257,858
CONTROLLABLE TRANSMISSION GEARS BETWEEN TWO CO-AXIAL SHAFTS
Filed Nov. 10, 1961  5 Sheets-Sheet 1

INVENTOR
ROELF J. MEIJER.
BY
AGENT

June 28, 1966 R. J. MEIJER 3,257,858
CONTROLLABLE TRANSMISSION GEARS BETWEEN TWO CO-AXIAL SHAFTS
Filed Nov. 10, 1961 5 Sheets-Sheet 3

INVENTOR
ROELF J. MEIJER.
BY
AGENT

INVENTOR
ROELF J. MEIJER.
BY
AGENT

INVENTOR
ROELF J. MEIJER.

3,257,858
CONTROLLABLE TRANSMISSION GEARS BETWEEN TWO CO-AXIAL SHAFTS

Roelf Jan Meijer, Emmasingel, Eindhoven, Netherlands, assignor to North American Philips Company, Inc., New York, N.Y., a corporation of Delaware
Filed Nov. 10, 1961, Ser. No. 151,566
Claims priority, application Netherlands, Dec. 29, 1960, 259,554
8 Claims. (Cl. 74—200)

The invention relates to a controllable transmission gear between two co-axial shafts which comprises two members which are arranged co-axially with the said shafts and have annular races. These races are concave in planes passing through the axis of the gear. A cage containing solids of revolution is interposed between the said members. These solids of revolution are arranged about the gear axis so as to be uniformly spaced from one another and from this axis, and serve as transmission members. One of the elements constituted by the members coupled to the shafts and by the cage is coupled to the driving shaft, another is coupled to the driven shaft and the third, which may be one of these members or the cage, is stationary or may also perform a rotary movement.

In such gears, it is known to use solids of revolution which are rotationally symmetric about one axis only. In particular, cylindrical or barrel-shaped members are used. These solids of revolution are secured in the associated cage with the aid of a shaft. Thus, they are enabled to rotate in the cage each about its axis of revolution. In this gear, the transmission ratio is obtained by axial displacement of the cage relative to the races. As a result, the distance by which the points of contact of the solids of revolution with one race are spaced from the gear axis is reduced, while the distance by which the points of contact of these solids with the other race are spaced from said axis is increased.

These known gears have a limitation in that forces in axial and radial directions may be produced which exert a comparatively large moment on the solids of revolution. These moments may give rise to large frictional losses in the bearings by which the solids of revolution are supported in the cage. Furthermore, owing to the forces exerted not only upon the solids of revolution but also upon the cage, these moments involve a heavy and complicated construction.

It is the object of the invention to mitigate these disadvantages. The invention is characterized in that the solids of revolution are balls and that at least one of the members comprising annular races is capable of elastic deformation, the said annular races having a greater radius of curvature in a plane passing through the gear axis than the balls, while means are provided for varying, in opposite directions, the distance by which the points of contact between the balls and one race are spaced from the axis and the distance by which the points of contact of the balls with the other race are spaced from the said axis, by tilting at least one of these races. The balls, which usually consist of steel, are enclosed in the cage between the two members. They are substantially precluded from radial or tangential displacement relative to the cage. In the operation of the gear, the races are pressed against the balls. In theory, each ball has only point contact with each race. In each transmission ratio, the balls adjust themselves so that the resultant of the axial and radial forces exerted on each ball in the points of contact passes approximately through its center. Since these forces are equal in both points of contact of each ball and these points are diametrical opposed with respect to the center of the ball concerned, the forces are balanced. The element coupled to the driving shaft, either a race or the cage, tends to drive the ball by means of tangential forces. Since this is prevented by one of the other two elements, each ball will rotate about an axis at right angles to the line joining the two points of contact of said ball with the races. As a result, the third element is driven by the balls. The case in which all three elements rotate is left out of consideration. If the cage rotates, the balls not only have a rotary movement about the above-mentioned axis at right angles to the line joining the points of contact, but also a rotary movement together with the cage about the gear axis. As has been mentioned hereinbefore, at least one of the members containing the races is capable of elastic deformation. Hence, the race considered may be slightly tilted. When a race is tilted, the existing equilibrium of the forces acting upon the balls is upset. The balls will now change their positions so that the points of contact of each ball with the races will again be diametrical to one another with respect to the center of the ball concerned. The resultants of the forces acting upon each ball in the axial and radial directions of the gear will again be balanced.

The race may be tilted by suitable means in which systems of forces are exerted upon two mutually radially displaced annular zones of the relevant deformable body comprising a race. This may be effected by a combination of a system of cup-springs and a hydraulic system. As an alternative, the hydraulic system may be replaced by a mechanical system.

A preferred embodiment of the gear in accordance with the invention is characterized in that the means for tilting one or both deformable bodies are such that the transmission ratio is continuously adjustable.

The forces exerted on the members comprising the annular races produce elastic deformation of these members. The race concerned is tilted by this deformation. In general, the desired effect, that is to say, the variation of the distance by which the points of contact between the races and the balls are spaced from the gear axis, is preferably obtained by slightly tilting the races. Hence, a preferred embodiment of the gear according to the invention is characterized in that, in planes passing through the gear axis, the races have a radius of curvature which exceeds the radius of curvature of the balls by at most 4%.

A preferred embodiment of the gear according to the invention is characterized in that systems of forces act upon each of the members capable of tilting. By these systems of forces, forces which are uniformly distributed about the axis are exerted upon the member concerned in zones encircling said axis. The size and/or direction of at least one of these systems of forces is/are variable. In the operation of the gear, one or either member is capable of tilting in two directions with respect to the position the member occupies if no forces from the said systems of forces are exerted upon it.

The forces required for the deformation of the members increase with increase in the deformation. Since the member is capable of tilting in two directions with respect to the position it occupies when no forces from the said systems of forces are exerted upon it, the members may be designed so that a large transmission range is covered by a slight degree of deformation. The members will be tilted through equal distances in both directions. Thus, the range of transmission ratios covered by a certain permissible deformation is equal to that which would require twice the amount of deformation if the body should be capable of tilting in one direction only. To tilt the body in two directions, the resulting forces acting upon the member for tilting it in one direction have to act in a direction opposite to that of the forces for tilting the member into the other direction.

A preferred embodiment of the gear according to the invention is characterized in that on each of the facing shaft-ends is secured a member comprising an annular race. The cage, which is locked against rotation, is interposed between the said members. In this embodiment, only one of the members comprising annular races is capable of tilting by means of a hinged attachment to the shaft concerned, while, in addition to the forces produced in this hinge, two further systems of forces are exerted on this member. One of these systems of forces results from the surface pressure between the balls and the race concerned, while the other system is produced by a spring and a hydraulic system. The forces supplied by the spring act in opposition to those exerted by the hydraulic system.

Although only one of the races is capable of tilting, this ensures that on variation of the distance by which the points of contact between the balls and one race are spaced from the axis, the distance by which the points of contact between the balls and the other race are spaced from the axis is also varied (in the opposite direction).

A number of gears according to the invention may be connected in cascade. One embodiment of such a combination is characterized in that the driving shaft of each succeeding gear is constituted by the driven shaft of the preceding gear. This provides the advantage that the transmission ratio is the product of the ratios of the coupled gears. A further advantage consists in that, when the combination comprises an even number of gears according to the invention, the driving shaft and the driven shaft have the same direction of rotation.

A preferred embodiment of such a combination comprising two cascade-connected gears is characterized in that two cages are interposed between the driving shaft and the driven shaft of the combination. On either side of each cage provision is made of a member comprising a concave race. The members facing the ends of the shafts are secured to the relevant shafts so as to be incapable of tilting. The members interposed between the two cages are not secured to the shafts but connected to one another by a rigid component so as to have the same speed of rotation. The members are connected, one by its annular outer circumference and the other by its annular inner circumference, to the rigid component so as to permit of tilting. By means of a hydraulic system, forces which are variable both in value and in direction may be exerted on these members.

In order that the invention may readily be carried into effect, embodiments thereof will now be described, by way of example, with reference to the accompanying diagrammatic drawings, in which.

Figure 1:
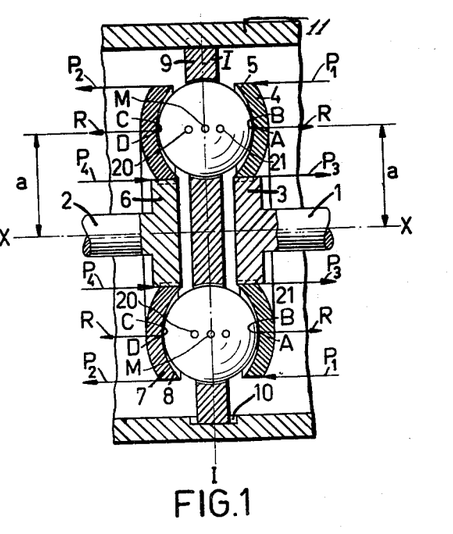
FIGURES 1 and 2 are a radial sectional view and a cross-sectional view, respectively, of the principle of the gear according to the invention.
Figure 2:
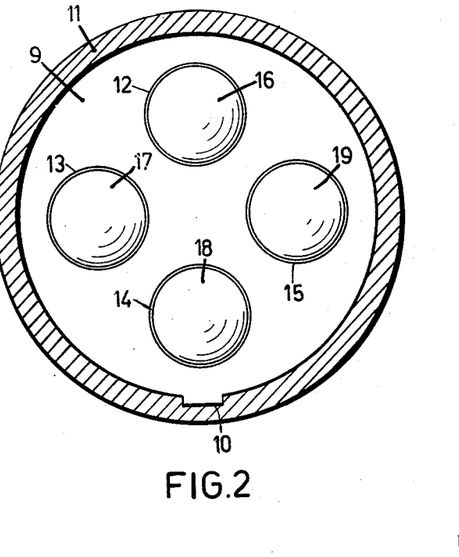

FIGURES 1 and 2 show diagrammatically the principle of the gear. Co-axial shafts are designated 1 and 2. The driving shaft 1 is provided with a collar 3. An annular member 4 comprising a concave race 5 is secured to this collar 3 so as to be rigidly connected to this collar 3 in the direction of rotation while being capable of a slight tilting movement relative to the collar 3 in the axial direction.

The driven shaft 2 is provided with a collar 6, to which an annular member 7 comprising a concave race 8 is secured. The connection between the annular member 7 and the collar 6 is similar to that between the annular member 4 and the collar 3. Between the said shafts 1 and 2 and the collars 3 and 6, there is interposed a cage 9 which is locked against rotation. This is shown by a key connection 10 between the cage 9 and walls 11 of a gear housing shown partially only. The cage 9 is provided with bores 12, 13, 14 and 15 for the accommodation of steel balls 16, 17, 18 and 19. In the embodiment shown, the gear comprises four balls. It will be appreciated that gears containing different numbers of balls may be made according to the same principle. The members 4 and 7 are shaped so as to be capable of elastic deformation. The races 5 and 8 provided in these members have a radius of curvature which is greater by 4% than that of the balls 16, 17, 18 and 19. In the operation of the gear, the races 5 and 8 are in contact with the balls 16, 17, 18 and 19. Axial forces, which are uniformly distributed about the circumference, act upon the elastically deformable members 4 and 7 in annular zones of different diameters. Forces $P_1$ and $P_2$ act upon the outer circumferences and forces P and $P_4$ act, in a direction opposite to that of the forces $P_1$ and $P_2$, upon the inner circumferences of the members 4 and 7. The gear shown in FIGURES 1 and 2 operates as follows. Under the action of the forces $P_1$, $P_2$, $P_3$ and $P_4$ and of thrust forces R exerted by the balls upon the races, the bodies 4 and 7 occupy positions such that points A and D of the races are in contact with points B and C of the balls. When the shaft 1 is driven, the points A of the race 5 are given a certain peripheral speed and owing to their engagement with the balls this speed is imparted to the points B of the balls. Since the balls cannot rotate about the axis X—X of the gear, because they are arranged in the stationary cage 9, they will rotate about an axis I—I, so that the points C of the balls will move at the same peripheral speed relative to the axis I—I as the said points B. Since the race 8 secured to the shaft 2 also engages the balls, the speed of the points C of the balls will be transmitted to the points D of the race 8. Since the pairs of points of contact A–B and C–D of the balls and the races are all spaced by the same distance $a$ from the axis X—X of the gear, the speeds of the shafts 1 and 2 will be equal, but the direction of rotation will be opposite. Hence, in this case the transmission ratio is unity.

Figure 3:
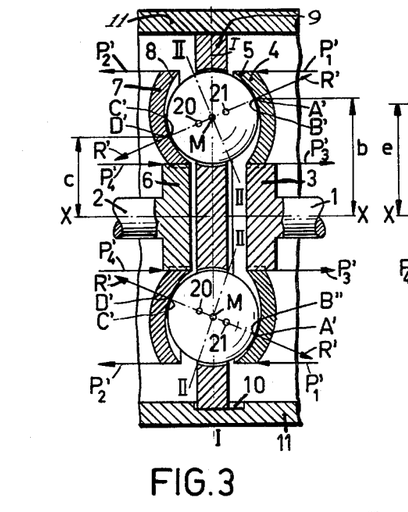
FIGURES 3 and 4 show the principle of the gear for positions of the races in which the transmission ratio is smaller or greater, respectively, than unity.

FIGURE 3 shows the situation in which the forces $P_1$, $P_2$, $P_3$ and $P_4$ are replaced by forces $P_1'$, $P_2'$, $P_3'$, $P_4'$. By these forces and by thrust forces produced between the balls and the races, the members 4 and 7 are elastically deformed so that the races occupy the positions shown in FIGURE 3. Since the races are slightly tilted under the action of this new distribution of forces, the centres of curvature of the races 5 and 8 are shifted so that now the centre of curvature 20 of the race 5 lies nearer to the axis X—X of the gear, whereas the centre of curvature 21 of the race 8 is spaced from this axis X—X by a larger distance. The normal forces exerted by the race 5 on the balls pass through the centre of curvature 20 of this race, and the same applies to the normal forces exerted by the race 8, which pass through the centre of curvature 21 of this race 8. Since the balls have a certain freedom of movement within the cage, they can occupy positions such that the normal forces exerted upon their surfaces are in equilibrium. In the case shown in FIGURE 3, the balls will also occupy positions such that their centres M are substantially in line with the centres of curvature 20 and 21 of the races 5 and 8. The pairs of points of contact A'–B' and D'–C' of the balls and the races will also lie on this line. The spacing $b$ between the pairs of points A'–B' and the axis X—X now is greater than the spacing $c$ between the pairs of points C'–D' and this axis. Since the shaft 1 is the driving shaft and the shaft 2 the driven shaft, the transmission ratio in this case is $c/b$, that is to say, less than unity.

Figure 4:
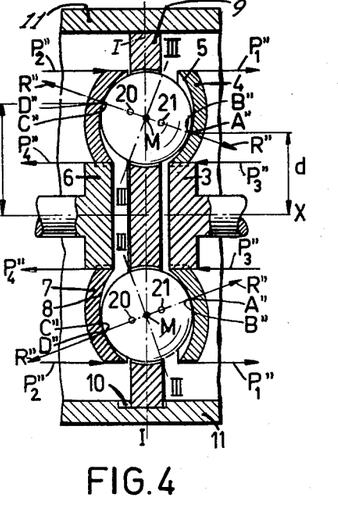

FIGURE 4 shows a case in which the forces exerted upon the members 4 and 7 are changed into $P_1''$, $P_2''$, $P_3''$ and $P_4''$. The elastically deformable annular members 4 and 7 and the balls 16, 17, 18 and 19 now will occupy the positions shown in FIGURE 4 under the action of the forces $P_1''$, $P_2''$, $P_3''$, and $P_4''$ and of the thrust forces produced between the balls and the races. In this case, the spacing $d$ between the pairs of points $A''$–$B''$ and the axis X—X is smaller than the spacing $e$ between the pairs of points $C''$–$D''$ and this axis. In this case, the transmission ratio $e/d$ is greater than unity.

Figure 5:
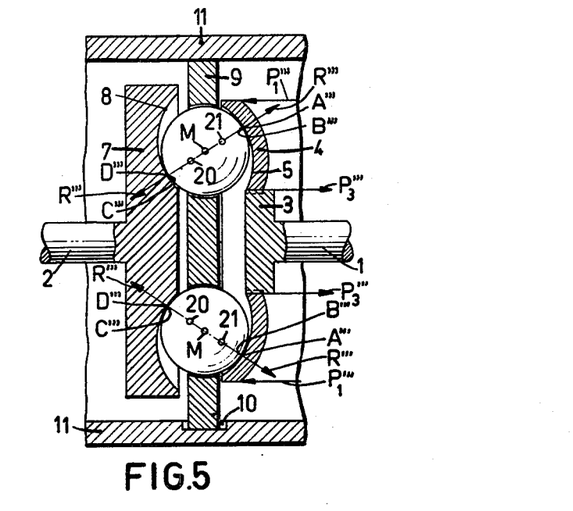
FIGURE 5 shows diagrammatically an embodiment of the gear in which only one of the races is capable of tilting. In this figure, this race is shown in a position in which the transmission ratio differs from unity.

In the embodiments shown in FIGURES 1 to 4, both members 4 and 7 are elastically deformable. In the embodiment shown in FIGURE 5, however, only one of these members, in the case under consideration the member 4, is capable of elastic deformation. In the position shown in FIGURE 5, the transmission ratio is smaller than unity. The shaft 1 is assumed to be the driving shaft. The member 7 is not elastically deformable. By the deformation of the annular member 4 and the resulting tilting of the race 5, the balls and the races will engage one another in pairs of points $A'''$–$B'''$ and $C'''$–$D'''$. The balls again occupy positions such that these pairs of points are diametrical with respect to the centres of the balls.

Figure 6:
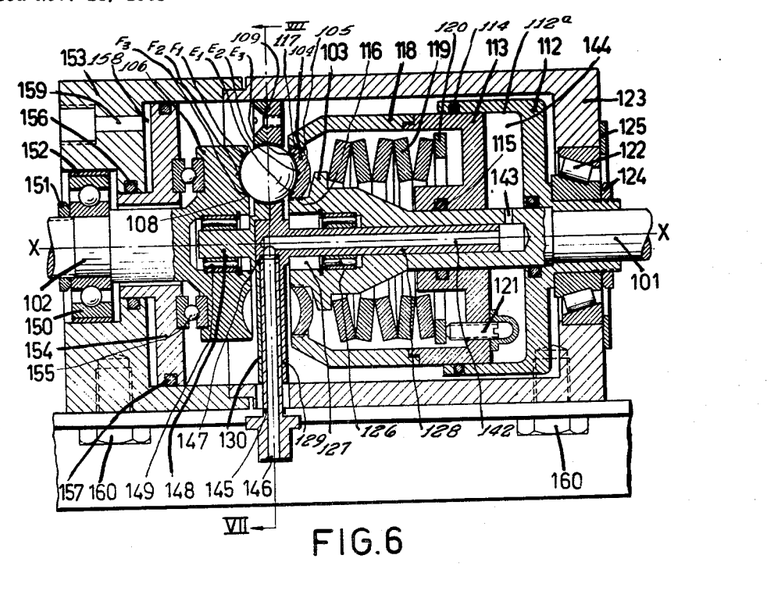
FIGURES 6 and 7 are sectional views of a gear according to the invention taken along a plane passing through the gear axis and at right angles to this axis, respectively.
Figure 7:
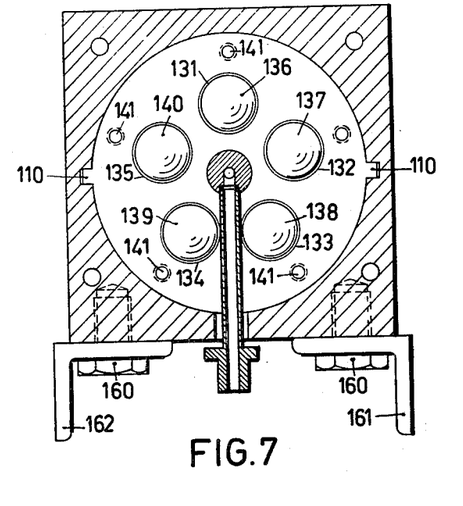

FIGURES 6 and 7 are sectional views of another embodiment of the gear taken along a plane passing through the gear axis and along a plane VII–VII shown in FIGURE 6, respectively. In these figures, the driving shaft is designated 101. A member 112 is secured to this shaft, a cylindrical inner part of this member being designated 112a. A piston-shaped member 113 is capable of reciprocating movement in this cylindrical inner part 112a. At the surfaces through which this member 113 engages the member 112 and the shaft 101, it is provided with sealing rings 114 and 115. The shaft 101 is provided at one end with a collar-shaped member 103, to which an elastically deformable annular member 104 is attached with some play by means of a screw connection 116. Owing to this play, the member 104 is capable of an axial tilting movement but not of rotation relative to the shaft 101. The steel member 104 is provided at one end with an annular race 105 which encircles the shaft and is concave in a sectional view along a plane passing through the gear axis. Due to its shape, this member can be so deformed elastically by forces exerted on it that the race 105 is tilted. When tilted, the race 105 will occupy the positions shown in FIGURES 1 to 5. By means of a screw connection 117, the outer circumference of the member 104 is joined with some play to a jacket-shaped component part 118 secured by a rigid screw connection to the piston-shaped member 113. A system 119 of cup-springs is interposed between the collar 103 of the shaft 101 and the piston-shaped member 113. The system 119 at one end bears upon the collar 103 and at the other end, through an annular member 120, upon adjusting screws 121 screwed into the piston-shaped member 113. The spring system 119 is inserted in the gear with an initial tension, the forces produced by this system being transmitted, through the piston-shaped member 113 and the jacket-shaped part 118, to the outer circumference of the member 104. Under the action of these forces, this member is tilted to the right about the screw connection 116. As a result, balls 136, 137, 138, 139 and 140 assume positions such as to engage the race 105 in points $E_1$. The shaft 101 and the parts secured thereto are supported by means of a roller bearing 122 in a part 123 of the bipartite housing of the gear. The roller bearing 122 is locked with respect to the shaft 101 by a nut 124 and with respect to the gear housing by an annular disc 125. The shaft 101 is also supported, by means of a needle roller bearing 126 accommodated in a bore 127 in the shaft 101, by a projecting part 128 of a bipartite cage 109. The cage 109 comprising parts 129 and 130 is locked in the part 123 of the housing against rotation about the axis X—X by a number of projections 110. However, the cage 109 is capable of slight axial movement. The two parts 129 and 130 are provided with bores 131, 132, 133, 134 and 135; these bores accommodate the above-mentioned balls 136, 137, 138, 139 and 140. When the balls are disposed in the bores, the parts 129 and 130 of the cage 109 are rigidly joined by bolts 141. The part 129 is provided with a projection 128 which fits slidingly in the shaft 101. The part 128 is provided with a bore 142 one end of which communicates, through a duct 143 in the shaft 101, with a chamber 144 formed by the member 112 and the piston-shaped member 113. A tubular member 145 is screwed into the cage 109. This tubular member has a bore 146 which communicates with the bore 142. Through the bores 146 and 142, a liquid under pressure may be supplied to the chamber 144. A seal 147 prevents oil from leaking away along the cage 109 and the member 145. The pressure produced in the chamber 144 exerts a force to the left upon the piston-shaped member 113. This force, which acts against the force supplied by the spring, is transmitted by the jacket-shaped part 118 to the outer circumference of the member 104, so that this member is tilted to the left. In accordance with the value of the liquid pressure in the chamber 144, the point of contact of each ball with the race 105 will be adjusted in the area between points $E_1$ and $E_3$. The parts 130 of the cage 109 is provided with a journal-shaped member 148 surrounded by a needle roller bearing 149. This bearing supports the driven shaft 102. This shaft 102 is provided at its end with a non-deformable collar 106 comprising a race 108 which encircles the axis X—X and is concave in a sectional view along a plane passing through this axis. A ball bearing 150 is secured to the shaft 102. The inner race of this bearing is locked to the shaft by a nut 151, whilst the outer race is capable of sliding movement in an annular member 152 locked against rotation about the axis X—X. Thus, the shaft 102 is capable of axial movement. The ball bearing 150 and the annular member 152 are accommodated in a part 153 of the gear housing. Part of the inner wall of the part 153 is shaped in the form of a cylinder in which a piston-shaped member 154 can reciprocate. The piston-shaped member 154 bears, through an axial thrust bearing 155, upon the collar 106 of the shaft 102. Sealing between the piston-shaped member 154 and the part 153 of the housing is provided by sealing rings 156 and 157. A chamber 158 formed by the piston-shaped member 154 and the housing 153 communicates with the ambient atmosphere through a duct 159. A liquid under pressure may be supplied to the chamber 158 through the duct 159. The liquid pressure in the chamber 158 exerts a force upon the piston 154 which is transmitted to the collar 106 by the thrust bearing. As a result, the races are pressed against the balls. The gear is mounted on supports 161 and 162 by means of bolts 160.

The gear operates as follows: Since the spring system 119 is enclosed with an initial tension between the collar 103 and the piston-shaped member 113, a force to the right is exerted on this member. This force is transmitted by the part 118 to the outer circumference of the steel member 104. By this force and the thrust force produced between the balls and the race, the member is slightly deformed elastically, so that the race 105 is tilted to the right. The balls now assume positions such as to be in contact with the races 105 and 108 in points $E_1$ and $F_1$ respectively (in FIGURE 4, points $A''$ and $D''$). If now a liquid under pressure is supplied to the chamber 144 through the duct system 146 and 142, a pressure to the left, that is to say, in a direction opposite to the pressure obtaining heretofore, is exerted on the piston-shaped member 113. As a result, the forces acting on the outer circumference of the member 104 are reduced. Hence, the elastic deformation is also reduced, so that the race 105 is tilted to the left with respect to its former position. In this situation, in which the elastic deformation is completely removed, the race 105 is in a position such that the balls are in contact with the races 105 and 108 in points $E_2$ and $F_2$, respectively. Thus, the transmission ratio is unity (see points A and D in FIGURE 1). If the pressure in the chamber 144 is increased, the forces exerted on the outer circumference of the member 104, which act to the left, will be increased. The member 104 will again be deformed elastically, so that the race 105 is tilted further to the left. The balls now assume positions in which they contact the races 105 and 108 in points $E_3$ and $F_3$, respectively. In this case, the transmission ratio is less than unity (see points A' and D' in FIGURE 3). In FIGURE 6, only three positions of the race 105 are shown, it will, however, be appreciated that, if the liquid pressure is progressively increased, the race 105 will assume all positions intermediate the positions in which the balls and the races are in contact with one another in the points designated $E_1$ and $E_3$ in the figure.

In the embodiments described so far, the driving shaft and the driven shaft rotate in opposite senses. The input and output shafts may be made to rotate in the same sense by connecting two or a multiple of two gears in cascade. Thus, the transmission ratio is the product of the transmission ratios of the coupled gears.

Figure 8:
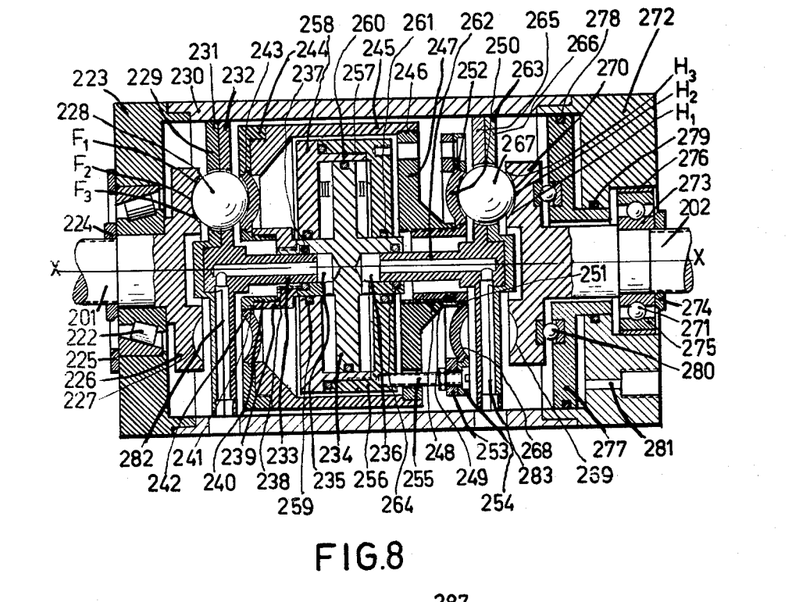
FIGURE 8 is an axial sectional view of an embodiment of a gear system comprising two cascade-connected gears according to the invention.

An embodiment of such a combination, in which two gears according to the invention are connected in cascade, is shown in FIGURE 8. The driving shaft is designated 201. The driving shaft 201 is supported by a roller bearing 222 in a part 223 of the gear housing. The inner race of the roller bearing 222 is locked with respect to the shaft by a lock nut 224, the outer race being locked with respect to the part 223 of the gear housing by an annular member 225. The driving shaft 201 is provided with an undeformable collar-shaped member 226 having a concave race 227 encircling the shaft. In the operation of the gear, this race is in contact with the balls 228 enclosed in annular recesses in a cage 229. By means of a key connection (not shown), the cage 229 is secured against rotation about the axis X—X of the gear with respect to a part 230 of the gear housing. The cage 229 comprises parts 231 and 232 which are rigidly joined to one another. The part 232 is provided with a projection 233. A piston-shaped member 234 has a hub-shaped part provided with bores 235 and 236. The piston-shaped member 234 bears at one end on the projection 233, which is inserted in the bore 235. Sealing between the contact surfaces of the projection 233 and the inner surface of the bore 235 is effected by a sealing ring 237. A part 239 is rigidly secured to the hub of the piston-shaped member 234 by a screw connection 238. A part 241 of an annular elastically deformable member 242 is secured between the part 239 and a member 240 acting as a nut. This connection is such as to permit a slight tilting movement of the member 242. The annular outer circumference of the member 242 is provided with a projection 243 clamped between a part 244 and a jacket-shaped member 245, which are rigidly connected to one another, so that the member 242 may be slightly tilted. A part 247 is secured to the jacket-shaped member 245 by a rigid screw connection 246. The part 247 is connected to a member 249 by a screw connection 248. An elastically deformable annular member 250 is provided at its annular inner circumference with a projection 251 and at its annular outer circumference with a projection 252. The projection 251 is clamped between the parts 247 and 249 so as to enable the member 250 to be slightly tilted with respect to these parts. The projection 252 is clamped between annular parts 253 and 254, which are rigidly joined to one another by a bolt and nut connection 255. The member 250 is capable of a slight tilting movement relative to these annular parts also. By the bolt and nut connection 255, the annular parts 253 and 254 are also rigidly connected to a part 256. A part 258 having a cylindrical inner surface is secured to the part 256 by a rigid screw connection 257. The said cylindrical inner surface cooperates with the cylindrical outer surface of the piston-shaped member 234, sealing being provided by rings 259, 260 and 261. The cylindrical inner surface of the bore 236 of the piston-shaped member 234 is supported by a projection 262 of a cage 263. Sealing between the inner surface of the bore 236 and the outer surface of the projection 262 is provided by a ring 264. The cage 263 comprises rigidly connected parts 265 and 266 and is secured against rotation about the axis X—X with respect to the part 230 of the gear housing by a key (not shown). In recesses in the cage 263, balls 267 are disposed which are in contact on one side with a race 268 of the elastically deformable member 250 and at the other side with a race 269 of an undeformable collar-shaped member 270 which is integral with the driven shaft 202. The driven shaft 202 is supported by a roller bearing 271 with respect to a part 272 of the gear housing. The inner race 279 of the roller bearing 271 is locked with respect to the driven shaft 202 by a lock nut 274. The outer race 275 of this ball bearing is accommodated in an annular part 276 locked against rotation about the axis X—X. The part 272 of the gear housing is provided with a cylindrical inner surface which cooperates with a piston-shaped member 277. Sealing between the piston-shaped member 277 and the part 272 of the gear housing is provided by rings 278 and 279. The piston-shaped member 277 bears upon the collar-shaped member 270 by means of an axial thrust bearing 280.

The part 272 of the gear housing is provided with a duct 281 which opens in the chamber enclosed between the part 272 of the gear housing and the piston-shaped member 277 and can be connected up with a pipe through which oil under pressure can be supplied by a system which is not shown. A chamber III enclosed between the piston-shaped member 234 and the part 258 communicates through a duct 282 with the space outside the gear and can be connected to an oil pressure pipe. A chamber II enclosed between the piston-shaped member 234 and the part 256 is also in communication with the space outside the gear through a duct 283 in the cage 263 and can also be connected to an oil pressure pipe.

The operation of the gear will now be described more fully with reference to FIGURES 9 and 10.

Figure 9:
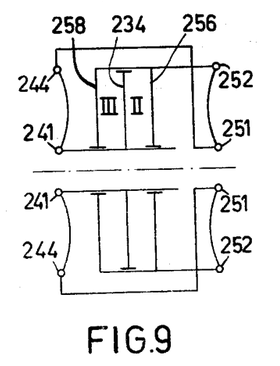
FIGURE 9 shows diagrammatically the principle of a gear system of FIGURE 8 in various positions.
Figure 10:
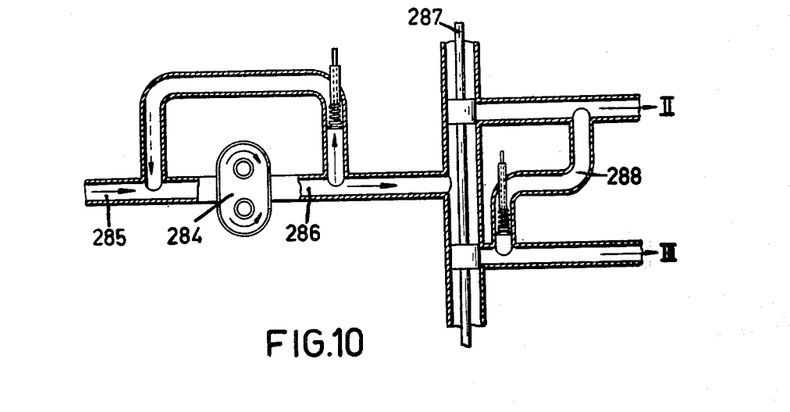
FIGURE 10 shows the hydraulic system for controlling the gear system of FIGURE 8.

FIGURE 9 shows diagrammatically the adjustable portion of the gear in various positions. FIGURE 10 shows the hydraulic system by which oil can be supplied to the chambers II and III. An oil supply system 284, which is shown as a gear oil pump, draws oil from a pipe 285 and delivers it under pressure through a pipe 286. A sliding control valve 287 can be adjusted so that the oil is delivered either to the chamber II or to the chamber III. The control slide can also be adjusted so that no oil is supplied to either chamber.

In the operation of the combination, oil under pressure is supplied, through the duct 281, to the chamber enclosed by the part 272 of the gear housing and the piston-shaped member 277. As a result, a force to the left is exerted on the piston-shaped member and transmitted by the ball bearing 280 to the collar-shaped member 270. As a result, the race 269 is pressed against the balls 267. Since the balls and the tilting members 250 and 242 are enclosed between the collar-shaped members 270 and 226, the pressure exerted by the race 269 on the balls 267 will also be produced between the balls 267 and the tilting member 250, and between the balls 228 and the races 220 and 227.

Figure 9A:
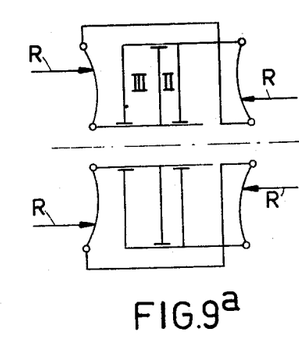

If the pressures in the chambers II and III are equal, only the thrust forces R produced between the balls and the races are exerted on the tilting members 242 and 250. By this thrust force R, the members 242 and 250 are slightly tilted, as is shown in FIGURE 9a. In this event, the transmission ratio will be less than unity, since the shaft 201 is the driving shaft.

Figure 9B:
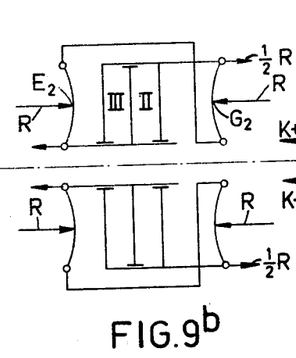

By moving the control slide 287 so that the pipe 286 is connected to the chamber II, the pressure in this chamber is increased. Consequently, a force to the right is exerted on the part 256 and a force to the left on the piston-shaped member 234. These forces are transmitted to the outer circumference of the member 250 and the inner circumference of the member 242. When the pressure in the space II is such that the forces exerted on the members 242 and 250 are equal to one half of the thrust force R, these members will assume the positions shown in FIGURE 9b. The balls and the races 220 and 268 are in contact in points $E_2$ and $G_2$, respectively. The balls will be adjusted so as to contact the races 227 and 269 in points $F_2$ and $H_2$, respectively. The points of contact $F_2$, $E_2$, $G_2$ and $H_2$ are all spaced from the gear axis X—X by the same distance, so that in this case the shafts 201 and 202 have the same speed.

Figure 9C:
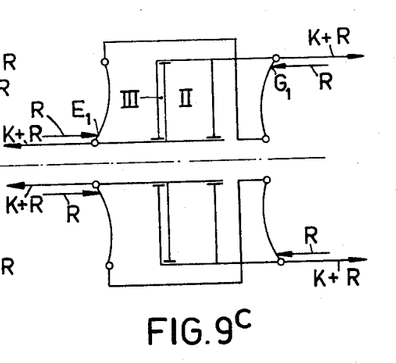

By further increasing the pressure in the chamber II, the forces exerted on the outer circumference and the inner cricumference of the tilting members 250 and 242, respectively, are increased, so that these members are tilted further. When the pressure in the chamber II is a maximum, the force exerted on the tilting members is equal to a force K required for the maximum tilting movement of the members 242 and 250 relative to their neutral positions increased by the thrust force R. In this case, the tilting members assume the positions shown in FIGURE 9c, the balls being in contact with these members in points $E_1$ and $G_1$, respectively. The balls are adjusted so that they engage the races 227 and 269 in points $F_1$ and $H_1$, respectively. In this case, the transmission ratio will exceed unity.

Figure 9D:
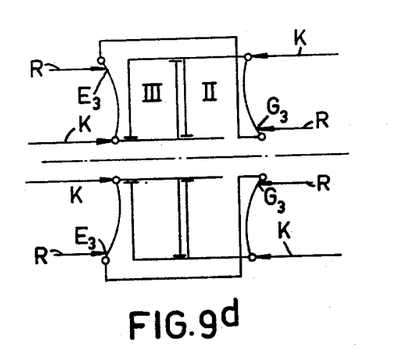

If, now, the control slide 287 is shifted so as to break the connection between the part 286 and the chamber II and to make the connection between the part 286 and the chamber III, the pressure in the chamber II collapses, so that the members 242 and 250 are no longer tilted. By increasing the pressure in the chamber III, forces are now exerted on the outer circumference of the member 250 and the inner circumstance of the member 242, the direction of which is opposite to that of the forces produced in the preceding case. The members 242 and 250 are now tilted in the other direction with respect to their neutral positions. To impart maximum tilting movement to these members, only the maximum deformation force K has to be exerted on the outer circumference of the member 250 and the inner circumference of the member 242 (FIGURE 9d). Hence, to effect this tilting movement, the pressure obtaining in the chamber III has to be lower than the pressure obtaining in the chamber II with maximum tilting of these members in the other direction. Since the chambers II and III are both supplied by the same gear pump, the chamber III has to communicate witth the chamber II through a pipe 288. The pipe 288 contains a valve, which is opened when the pressure in the chamber III exceeds the pressure which causes a force K to be exerted on the members. This prevents the pressure in the chamber III from becoming excessive, so that the members 242 and 250 should be subjected to excessive forces, which could destroy them. If the forces K are exerted on the members 242 and 250, these members assume the positions shown in FIGURE 2d. The balls contact the races in points $E_3$ and $G_3$ and are adjusted so as to contact the races 227 and 269 in points $F_3$ and $H_3$, respectively. In this case, the transmission ratio is less than unity.

What is claimed is:

1. An adjustable gear positioned between a co-axially arranged drive shaft and driven shaft comprising two members located co-axially with said shafts and provided with annular races having concave faces, a cage interposed between said members and including a plurality of balls equidistant from the central axis of said gear, said balls acting as transmission members, said two members and said cage constituting three elements, means for coupling one of said elements to said drive shaft, means for coupling a second of said elements to said driven shaft, said third element being fixed, said races having in a plane passing through the central axis of said gear a radius of curvature which is larger than the radius of curvature of said balls, means for deforming at least one of said members resiliently by axial displacement of said inner and outer periphery relative to each other whereby the distance by which the points of contact of said balls with one of said races are spaced from the axis of said gear and can vary in opposite directions, and means which exert forces upon said deformable members in at least two circular and concentric zones with said gear axis, said means determining the desired position of said deformable members without influencing the magnitude of the variable contact forces between said balls and races.

2. An adjustable gear as claimed in claim 1 wherein at least one of said members are continually adjustable by said means for deforming at least one of said races.

3. An adjustable gear as claimed in claim 2 wherein said forces act on each of said deformable races so that the forces uniformly distributed about the axis are exerted on zones of the relevant member which encompass said axis, one of said forces being variable in size while in the operation of said adjustable gear at least one of said members is capable of deforming in two alternative directions relative to the position it occupies when no forces are exerted on said member.

4. An adjustable gear as claimed in claim 1 wherein the races of said members have a radius of curvature which is greater than the radius of curvature of said balls by a maximum of 4%.

5. An adjustable gear positioned between a co-axially arranged drive shaft and driven shaft comprising two members located co-axially with said shafts and provided with annular races having concave faces, a cage interposed between said members and including a plurality of balls equidistant from one another and from the central axis of said gear, said balls acting as transmission members, said two members and said cage constituting three elements, means for coupling one of said elements to said drive shaft, means for coupling a second of said elements to said driven shaft, said third element being fixed, said races having in a plane passing through the central axis of said gear a radius of curvature which is larger than the radius of curvature of said balls, means for deforming at least one of said members resiliently by axial displacement of said inner and outer periphery relative to each other whereby the distance by which the points of contact of said balls with one of said races are spaced from the axis of said gear and can vary in opposite directions, and means which exert forces upon said deformable members in at least two circular and concentric zones with said gear axis, said means determining the desired position of said deformable members without influencing the magnitude of the variable contact forces between said balls and races, and a spring and a hydraulic system, one of said members provided with an annular race being secured to the end of an adjacent facing shaft, means on said cage interposed between said members for locking said cage against rotation, two further forces exerted on said resilient member, one of which is produced by surface pressure between the balls and the corresponding race while the other is exerted by said spring and said hydraulic system, the forces supplied by the spring acting in opposition to those exerted by said hydraulic system.

6. A cascade arrangement of two gears as claimed in claim 1 wherein the driving shaft of each succeeding gear is the driven shaft of the preceding gear.

7. A cascade arrangement of two gears as claimed in claim 6 wherein two cages are interposed between said input shaft and output shaft, members with said annular races being located on either side of each cage, the members at the sides facing said shafts being secured to an adjacent shaft so as to preclude tilting thereof and the members interposed between said two cages being connected together so as to have the same speed of rotation, the annular outer circumference of one of the latter members and the annular inner circumference of the other member being secured so as to be capable of a tilting motion, and an hydraulic system for exerting forces on said members which are variable in size and direction.

3. An adjustable gear positioned between a co-axially arranged drive shaft and driven shaft comprising two members located co-axially with said shafts and provided with annular races having concave faces, a cage interposed between said members and including a plurality of balls equidistant from the central axis of said gear, said balls acting as transmission members, said two members and said cage constituting three elements, means for coupling one of said elements to said drive shaft, means for coupling a second of said elements to said driven shaft, said third element being fixed, said races having in a plane passing through the central axis of said gear a radius of curvature which is larger than the radius of curvature of said balls, means for deforming at least one of said members resiliently by axial displacement of said inner and outer periphery relative to each other whereby the distance by which the points of contact of said balls with one of said races are spaced from the axis of said gear and can vary in opposite directions, and means which exert forces upon said deformable members in at least two circular and concentric zones with said gear axis, said means determining the desired position of said deformable races without influencing the magnitude of the variable contact forces between said balls and races.

References Cited by the Examiner
UNITED STATES PATENTS

| | | | |
|---|---|---|---|
| 1,850,189 | 3/1932 | Weiss | 74—190.5 |
| 2,040,833 | 5/1936 | Chilton | 74—208 X |
| 2,478,227 | 8/1949 | Bannister | 74—199 |

MILTON KAUFMAN, *Primary Examiner.*

BROUGHTON G. DURHAM, DON A. WAITE,
*Examiners.*

T. W. SHEAR, *Assistant Examiner.*